Jan. 17, 1967   M. J. McKELVEY   3,298,273
RELEASABLE FASTENER
Filed March 17, 1965
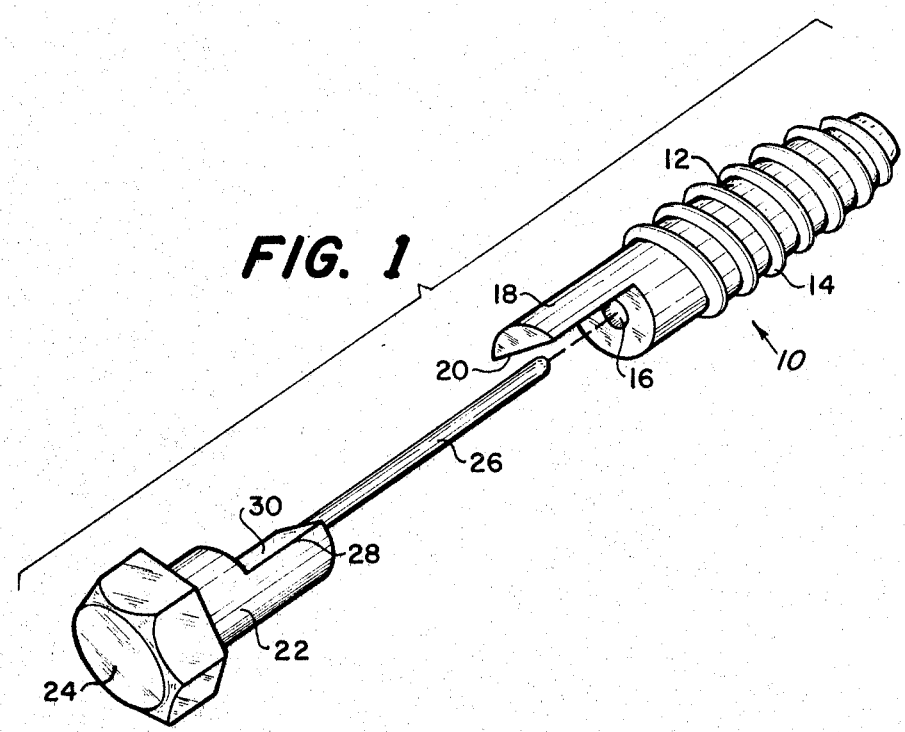
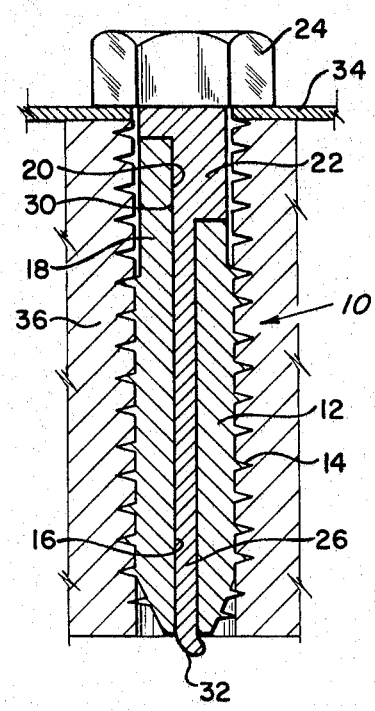
INVENTOR.
MICHAEL J. McKELVEY
BY George Raymond
HIS ATTORNEY

United States Patent Office 3,298,273
Patented Jan. 17, 1967

3,298,273
RELEASABLE FASTENER
Michael J. McKelvey, 1304 Berryman Ave.,
Bethel Park, Pa. 15102
Filed Mar. 17, 1965, Ser. No. 440,383
3 Claims. (Cl. 85—62)

The present invention relates to threaded-type fasteners and, more particularly, to a threaded fastener which releases when the fastener is subjected to a longitudinal force in excess of a predetermined force.

In many fields, there is a requirement for fasteners which are sufficient to hold two structural units together up to a predetermined force being exerted to part the units. When a force of a predetermined magnitude is exerted to separate the units, it is desirable that the fastener holding the units together release so that the units may part with a minimum of damage. If the fastener is constructed so that it is the strongest portion of the link, damage and hazardous conditions can result because structural elements cannot part.

An example of such an arrangement is a building having a rigid metal superstructure covered with sheet metal. If activities which have an explosive hazard are conducted within such a building, it is very desirable that the sheet metal be attached to the superstructure of the building with fasteners which will release under a predetermined load force. Thus, if an explosion should occur within the building, the sheet metal will be blown loose from the superstructure of the building because of the failure of the fasteners. Such an occurrence will greatly reduce the damage from shock within the building, and will also serve to preserve the superstructure of the building since it will not be twisted and torn out of shape by the force of the explosion.

In construction work, many people have attempted to create fasteners which would fail under a predetermined load by narrowing a portion of the fastener so that it would break under the predetermined load. This method has proven to be generally unsatisfactory since the narrowed portion of the fastener causes it to have an inherent weakness which prevents torque being applied to the fastener to tighten it into position. For example, with fasteners and threaded fasteners of the self-tapping type, when a portion of the fastener is narrowed, the fastener often breaks before it can be properly inserted in position. Further, a narrowed fastener cannot be tightened to obtain a weather-tight seal. Most fasteners of the nut and bolt type require two people to put them in place, i.e., one outside and one inside the structure.

The present invention is directed to a fastener which is designed to release upon being subject to a predetermined longitudinal force. At the same time, the fastener of the present invention is so designed that full torque transfer may take place through the fastener so as to permit threaded fasteners to be built in accordance with the present invention, as well as fasteners having self-tapping threads. The self-tapping fasteners of the present invention can be installed from one side by one person.

With the foregoing considerations in mind, it is an object of the present invention to provide an improved releasable fastener.

Another object of the present invention is to provide a fastener which releases when subjected to a predetermined longitudinal force.

Another object of the present invention is to provide a fastener which may be designed to release at any particular predetermined force.

Another object of the present invention is to provide a useful, releasable, self-tapping threaded fastener.

These and other objects of the present invention will become apparent as this description proceeds in conjunction with the accompanying drawing.

In the drawing:

FIGURE 1 is an exploded perspective view of the fastener of the present invention in a disassembled configuration;

FIGURE 2 is a longitudinal sectional view of the present invention showing the self-tapping fastener holding a plate onto a metal structure.

Referring to the drawings, a releasable fastener 10 is formed in two parts.

The releasable fastener 10 has a threaded portion 12 which has threads 14 formed on the exterior surface thereof. In the drawings, self-tapping threads are shown at 14 and the threaded fastener is generally of the self-tapping screw type. It will be appreciated that the present invention can be utilized with ordinary threads as well as self-tapping threads, and that the fastener of the present invention can be utilized, for example, as the bolt of a nut-and-bolt-type fastener arrangement.

The fastener threaded portion 12 has a coaxial bore 16 formed longitudinally therethrough. At the non-threaded end of threaded portion 12, an abutment 18 extends longitudinally therefrom. The abutment 18 is generally cylindrical on its outer surface, and has a planar surface 20 formed thereon. The planar surface 20 extends as the cord of the arc formed by the outer surface of abutment 18.

The second part of the two-part releasable fastener 10 is a head portion 22. The head portion 22 has a tool engageable head 24 formed thereon. In the drawings, the head 24 is formed as a standard hexagonal bolt head. It will be appreciated that a cap screw type head, or a Phillips head, or an Allen head arrangement could also be formed on the head portion 22.

Extending coaxially from the head portion 22 is a connecting probe 26. The connecting probe 26 is constructed to extend into and through the coaxial bore 16 formed in threaded portion 12.

The head portion 22 has a cutaway portion 28 which has a planar surface 30. The planar surface 30 lies in a plane parallel to the axis of head portion 22 and to the axis of probe 26. In a like manner, the planar surface 20 on threaded portion 12 lies in a plane parallel to the axis of the threaded portion 12.

As best seen in FIGURE 2, the fastener 10, when in an assembled position, has the probe 26 positioned within the coaxial bore 16 in threaded portion 12. Because of the arrangement of the cutaway portion 28 on head portion 22 and the abutment 18 on threaded portion 12, the abutment 18 positions itself within the cutaway portion 28 and the planar surfaces 20 and 30 become coincident.

Because of the planar surfaces 20 and 30, torque may be transmitted through the head portion 22 to the threaded portion 12 so that, when assembled, the releasable fastener 10 may be inserted and utilized in the same manner as any self-tapping fastener.

After the probe 26 is inserted into the coaxial bore 16, the probe 26 is deformed as at 32 to retain the head portion and the threaded portion together as one fastener unit.

As shown in FIGURE 2, the probe 26 may be deformed by bending it over, or it may be deformed by peening, splitting, or any other conventional method of holding the probe 26 within the coaxial bore 16.

A thickness of the probe 26 at the deformed point 32 and the type of deformation will control the longitudinal force required to release the fastener 10. If the probe is relatively thin in cross section, the fastener 10 will be more readily released. Peening of the probe will tend to increase the force required to release the fastener.

As shown in FIGURE 2, the fastener 10 is fastening a sheet metal structure 34 to a rigid frame 36. The fastener 10 has been inserted through a hole formed in the sheet 34 and has self-tapped itself into the structure 36. The sheet 34 will be held to structure 36 so long as no force is exerted under sheet 34 to pull it away from structure 36 which is great enough to straighten the deformed point 32 of probe 26.

If the sheet 34 were the corrugated side of a building, and an explosion were to take place within the building, the sheet 34 would be subjected to a great force outwardly. This force, being sufficient to straighten the deformed point 32 of probe 26 would cause the head portion 22 of the fastener 10 to be blown outwardly from the threaded portion 12. The parts of the fastener would then assume the position shown in FIGURE 1. This would cause the fastener to cease to be effective for fastening a plate to a structure.

It will be appreciated that a fastener of the present invention can be utilized with a nut-and-bolt-type arrangement, as well as with a sheet metal screw arrangement, and the self-tapping arrangement. It will also be appreciated that the force required to separate the fastener can be controlled by controlling the thickness of the probe 26 at the point 32 at which it is deformed, as well as the type of deformation utilized. Because of the planar surfaces 20 and 30 which coincide when the fastener is in an assembled position, substantial torque can be transferred through the head portion 22 of the fastener 10 to the threaded portion 12 of the fastener 10.

According to the provisions of the patent statutes, I have explained the principle, preferred construction and mode of operation of my invention and have illustrated and described what I now consider to represent its best embodiment. However, I desire to have it understood that, within the scope of the appended claim, the invention may be practiced otherwise than as specifically illustrated and described.

I claim:
1. A releasable fastener adapted to release upon being subjected to a predetermined longitudinal force comprising:
    (a) a threaded portion having a coaxial cylindrical bore;
    (b) a head portion having an extended cylindrical connecting portion adapted to be received within and extend completely through said threaded portion cylindrical bore and having an end portion deformable to lock said head portion to said threaded portion to thereby maintain assembly of said fastener;
    (c) means on said head portion and said threaded portion to prevent relative rotation between said head portion and said threaded portion are locked to each other by said connecting portion said means including mating planar surfaces lying in planes parallel to the axis of said fastener and laterally offset therefrom;
    (d) said connecting portion being so proportioned that said threaded portion is released longitudinally from said head portion when said fastener is subjected to a longitudinal force in excess of a predetermined force.

2. The releasable fastener of claim 1 wherein said threaded portion has self-tapping threads formed thereon.

3. A releasable fastener adapted to release upon being subjected to a predetermined longitudinal force comprising:
    (a) a threaded portion having a coaxial cylindrical bore and a planar surface parallel to the axis of said bore but offset from said axis formed thereon;
    (b) a head portion having an extended cylindrical connecting portion adapted to be received within and extend completely through said threaded portion cylindrical bore and having an end portion deformable to lock said head portion to said threaded portion and a planar surface parallel to the axis of said head portion but offset from said axis, said connecting portion maintaining assembly of said fastener;
    (c) said head portion and said threaded portion planar surfaces offset from the axis of said fastener mating to prevent relative rotation between said head portion and said threaded portion when said head portion and said threaded portion are locked to each other by said connecting portion;
    (d) said connecting portion being so proportioned that said threaded portion is released longitudinally from said head portion when said fastener is subjected to a longitudinal force in excess of a predetermined force.

References Cited by the Examiner
UNITED STATES PATENTS

| | | | |
|---|---|---|---|
| 839,821 | 1/1907 | Dumont | 85—9 |
| 869,443 | 10/1907 | Lund | 85—61 |
| 1,018,741 | 2/1912 | Davis | 85—17 |
| 1,224,936 | 5/1917 | Kline | 85—7 |
| 1,264,251 | 4/1918 | Zavarkin | 85—9 |
| 1,469,126 | 9/1923 | Thomas. | |
| 2,083,054 | 6/1937 | Cline. | |
| 2,165,656 | 7/1939 | Ryan | 85—9 |
| 2,620,832 | 12/1952 | Alix et al. | 85—9 |

CARL W. TOMLIN, *Primary Examiner.*

M. PARSONS, JR., *Assistant Examiner.*